(12) United States Patent
Wells et al.

(10) Patent No.: US 7,487,848 B2
(45) Date of Patent: Feb. 10, 2009

(54) MULTI-SEAL FOR TOP DRIVE SHAFT

(75) Inventors: Larry Wells, Yorba Linda, CA (US); Svein Stubstad, Houston, TX (US); Howard Ervin, Spring, TX (US); James D. Brugman, Spring, TX (US); Paul Conover, Cypress, TX (US)

(73) Assignee: Varco I/P, Inc., Houston, TX (US)

( * ) Notice: Subject to any disclaimer, the term of this patent is extended or adjusted under 35 U.S.C. 154(b) by 229 days.

(21) Appl. No.: 11/414,514

(22) Filed: Apr. 28, 2006

(65) Prior Publication Data

US 2007/0251705 A1 Nov. 1, 2007

(51) Int. Cl.
*E21B 3/06* (2006.01)
*E21B 33/02* (2006.01)

(52) U.S. Cl. .................. 175/113; 175/162; 277/342; 277/551; 277/564; 277/914

(58) Field of Classification Search .......... 277/323, 277/342, 551, 562, 564, 914; 175/113, 162; 166/78.1
See application file for complete search history.

(56) References Cited

U.S. PATENT DOCUMENTS

| | | | |
|---|---|---|---|
| 1,377,575 A | 5/1921 | Greve | |
| 4,421,179 A | 12/1983 | Boyadjieff | 173/44 |
| 4,449,596 A | 5/1984 | Boyadjieff | 175/85 |
| 4,458,768 A | 7/1984 | Boyadjieff | 175/85 |
| 4,529,045 A | 7/1985 | Boyadjieff et al. | 173/164 |
| 4,605,077 A | 8/1986 | Boyadjieff | 175/85 |
| 4,753,300 A | 6/1988 | Shaw et al. | 173/164 |
| 4,800,968 A | 1/1989 | Shaw et al. | 175/85 |
| 4,809,792 A | 3/1989 | Lynch | 175/113 |
| 4,813,493 A | 3/1989 | Shaw et al. | 173/164 |
| 4,872,517 A | 10/1989 | Shaw et al. | 173/163 |
| 4,878,546 A | 11/1989 | Shaw et al. | 173/163 |
| 5,433,279 A | 7/1995 | Tessari et al. | 173/213 |
| 5,755,296 A | 5/1998 | Richardson et al. | 175/162 |
| 6,050,348 A | 4/2000 | Richarson et al. | 175/26 |
| 6,152,454 A * | 11/2000 | Marnot | 277/551 |
| 6,244,345 B1 | 6/2001 | Helms | 166/301 |
| 6,536,520 B1 | 3/2003 | Snider et al. | 166/78.1 |
| 6,679,333 B2 | 1/2004 | York et al. | 166/379 |

(Continued)

FOREIGN PATENT DOCUMENTS

GB 185465 9/1922

(Continued)

OTHER PUBLICATIONS

Top Drive Drilling System—PS-500A; National Oilwell; 2 pp.; 2004.

(Continued)

*Primary Examiner*—William P Neuder
*Assistant Examiner*—Brad Harcourt

(57) ABSTRACT

A multi-seal sealing assembly with multiple seals so that when one seal wears out another can be moved into sealing position; and a top drive system for wellbore operations with such a sealing assembly; the sealing assembly in one aspect having a seal carrier movable to move at least one secondary seal into sealing position when a primary seal has worn out.

8 Claims, 4 Drawing Sheets

U.S. PATENT DOCUMENTS

| | | |
|---|---|---|
| 6,688,398 B2 | 2/2004 | Pietras ........................ 166/380 |
| 6,725,938 B1 | 4/2004 | Pietras ........................ 166/380 |
| 6,725,949 B2 * | 4/2004 | Seneviratne ................. 175/85 |
| 6,834,860 B2 | 12/2004 | Rinaldo ...................... 277/418 |
| 6,913,096 B1 | 7/2005 | Nielsen et al. ................. 175/85 |
| 6,923,254 B2 | 8/2005 | Morrow et al. ............. 166/88.4 |
| 7,007,753 B2 | 3/2006 | Robichaux et al. .......... 166/291 |
| 7,021,374 B2 | 4/2006 | Pietras .................... 166/77.51 |
| 7,055,594 B1 | 6/2006 | Springett et al. ........... 166/85.1 |
| 7,213,660 B2 | 5/2007 | Martin ....................... 175/207 |
| 7,222,683 B2 | 5/2007 | Folk et al. ................... 175/162 |
| 7,231,969 B2 | 6/2007 | Folk et al. ................. 166/77.51 |
| 7,343,968 B2 | 3/2008 | Kubala .................... 166/75.11 |
| 2006/0096751 A1 | 5/2006 | Brown et al. ............. 166/77.52 |

FOREIGN PATENT DOCUMENTS

| | | |
|---|---|---|
| GB | 2228025 | 9/1989 |

OTHER PUBLICATIONS

ES-7 Electric Drilling Swivel System: Bowen Tools, Inc.; Cover page thru p. 7-9 & Drawings Q-84418, Q-65680.

* cited by examiner

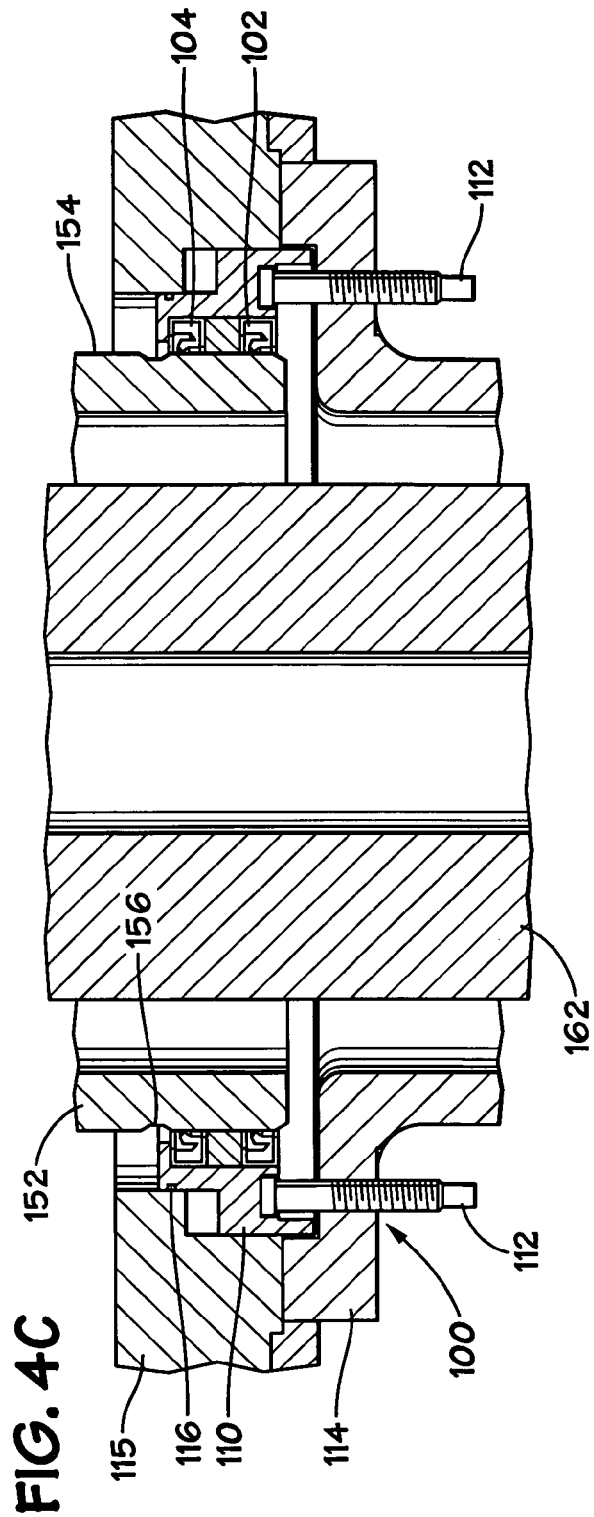
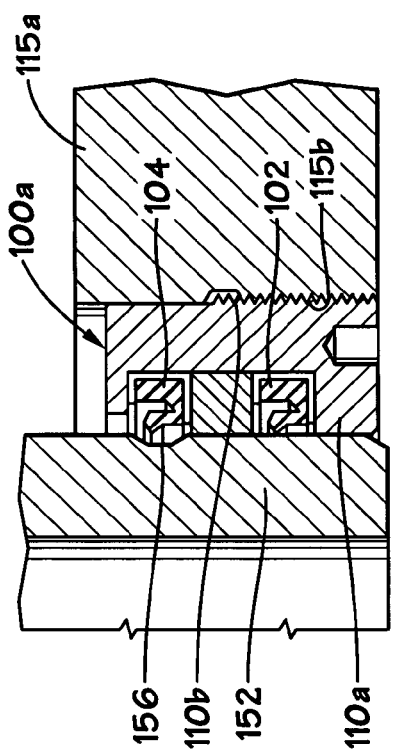
FIG. 4C
FIG. 4D

MULTI-SEAL FOR TOP DRIVE SHAFT

BACKGROUND OF THE INVENTION

1. Field of the Invention

This invention is directed to wellbore drilling top drive systems; to shaft seals for such systems; and to sealing systems for rotating shafts.

2. Description of Related Art

The prior art reveals a variety of elastomeric lip seals for sealing against rotating shafts. Such seals are frequently used to contain lubricating oil in gear boxes and other mechanical assemblies. Because of their rubbing contact with an adjacent shaft, such seals eventually wear or are damaged to the point that the lubricant or oil they are meant to contain may leak out, causing various negative consequences. Repair or replacement of such seals can entail significant time and expense, and lost production, often requiring the removal of other machine components before clear access to the seal can be obtained.

In the prior art are a variety of top drives which have a rotating main shaft and a thrust bearing apparatus which bears the weight of the top drive and of tubulars connected thereto. In order to prevent lubricant for the thrust bearing apparatus from flowing down, a shaft seal is used with a seal member that contacts the exterior surface of the rotating shaft. When these seals wear out, it is an expensive and time-consuming task to access them and replace them.

The prior art discloses a variety of top drive systems; for example, and not by way of limitation, the following U.S. Patents present exemplary top drive systems and sealing assemblies: U.S. Pat. No. 4,458,768; 4,807,890; 4,984,641; 5,433,279; 6,276,450; 4,813,493; 6,705,405; 4,800,968; 4,878,546; 4,872,577; 4,753,300; 6,007,105; 6,536,520; 6,679,333; 6,923,254.

BRIEF SUMMARY OF THE INVENTION

The present invention, in certain aspects, provides a shaft sealing assembly with at least two seals: at least one primary seal for use initially and at least one secondary seal that is movable into place when the primary seal becomes ineffective due to wear or damage.

In one particular aspect the secondary shaft seal (or seals) is carried on a movable support which is selectively movable when the primary seal becomes worn. The secondary seals can be moved into place to sealingly contact the shaft exterior without accessing the primary seals and without removal of the primary seals. Multiple sealing surfaces are provided on the shaft so that the secondary seal(s) can be moved into sealing contact with corresponding sealing surface(s).

The present invention discloses, in certain embodiments, a top drive system with a drive motor; a gear system coupled to the drive motor; a drive quill and/or main shaft coupled to the gear system; a top drive support system for supporting various items; and a multi-seal apparatus according to the present invention for sealing against a shaft, (e.g. the main shaft, a quill, and/or a lowest rotating element) with a primary seal (or seals) and secondary seal or at least one secondary seal that can be moved into a sealing relationship with a shaft of the system, e.g. the main shaft and/or the quill, when the primary seal is no longer effective. In one aspect, the secondary seal (or seals) is isolated within part of a lubricant bath or gear box or gear housing with lubricant therein so that the secondary seal (or seals) is in a lubricant bath and is protected from external debris and contaminants prior to its movement and sealing engagement with a seal surface. Thus, the secondary seal (or seals) is maintained in a virtually new, pristine condition until it is placed in use.

It is, therefore, an object of at least certain preferred embodiments of the present invention to provide:

New, useful, unique, efficient, non-obvious top drive systems, multi-seal shaft sealing assemblies for such systems, and methods of their use; and New, useful, unique, efficient, non-obvious shaft sealing apparatuses with a first seal (or seals) and with a second seal (or seals), the second seal(s) movable into place to seal a shaft when the first seal(s) no longer seal effectively.

The present invention recognizes and addresses the problems and needs in this area and provides a solution to those problems and a satisfactory meeting of those needs in its various possible embodiments and equivalents thereof. To one of skill in this art who has the benefits of this invention's realizations, teachings, disclosures, and suggestions, various purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later attempt to disguise it by variations in form or additions of further improvements.

The Abstract that is part hereof is to enable the U.S. Patent and Trademark Office and the public generally, and scientists, engineers, researchers, and practitioners in the art who are not familiar with patent terms or legal terms of phraseology to determine quickly from a cursory inspection or review the nature and general area of the disclosure of this invention. The Abstract is neither intended to define the invention, which is done by the claims, nor is it intended to be limiting of the scope of the invention in any way.

It will be understood that the various embodiments of the present invention may include one, some, or all of the disclosed, described, and/or enumerated improvements and/or technical advantages and/or elements in claims to this invention.

BRIEF DESCRIPTION OF THE SEVERAL VIEWS OF THE DRAWING

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or equivalent embodiments.

FIG. 4C is a cross-section view showing a shift in part of the system of FIG. 4A.

FIG. 4D is a cross-section view of part of a system according to the present invention.

DETAILED DESCRIPTION OF THE INVENTION

Figure 1:
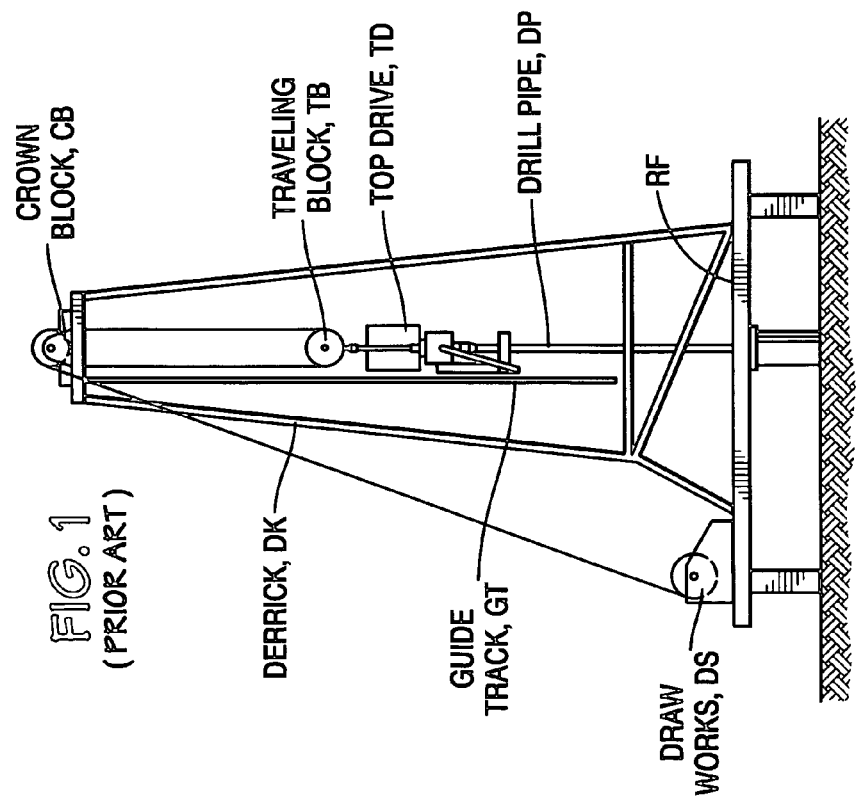
FIG. 1 is a schematic view of a prior art top drive drilling system.

FIG. 1 shows a typical prior art drilling system with a derrick DK supporting a top drive TD which rotates drill pipe DP. The top drive is supported from a travelling block TB beneath a crown block CB. A drawworks, DS, on a rig floor RF raises and lowers the top drive. The top drive moves on a guide track GT. In one particular aspect, a seal system according to the present invention is used with a top drive system according to the invention disclosed in co-owned U.S. Patent Application Ser. No. filed on even date herewith entitled "Top Drive Systems," incorporated fully herein for all purposes.

Figure 2:
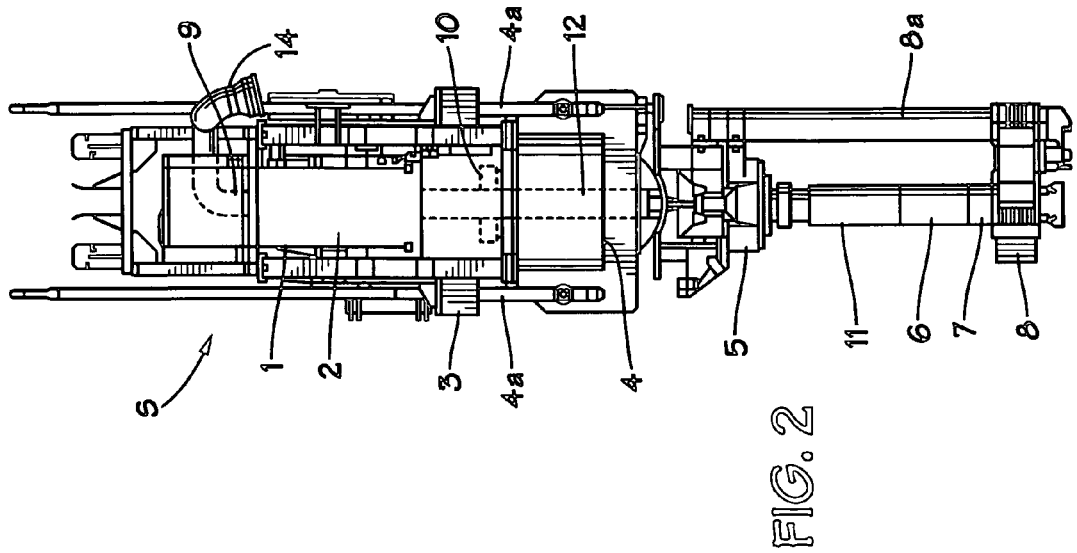
FIG. 2 is a front view of a top drive system according to the present invention with seal apparatus according to the present invention.

FIG. 2 shows a system S according to the present invention with a top drive 1 with a drive motor 2; a gear system 3 coupled to the top drive 1 with a bearing support 4 and support links 4a; a washpipe apparatus 9; a gooseneck 14; an elevator load ring 5; a mud saver system 11; a lower internal blowout preventer 6; a saver sub 7; a top drive main shaft 12; a pipe gripper 8 with support 8A; and a seal system 10 (shown schematically) according to the present invention.

Figure 3:
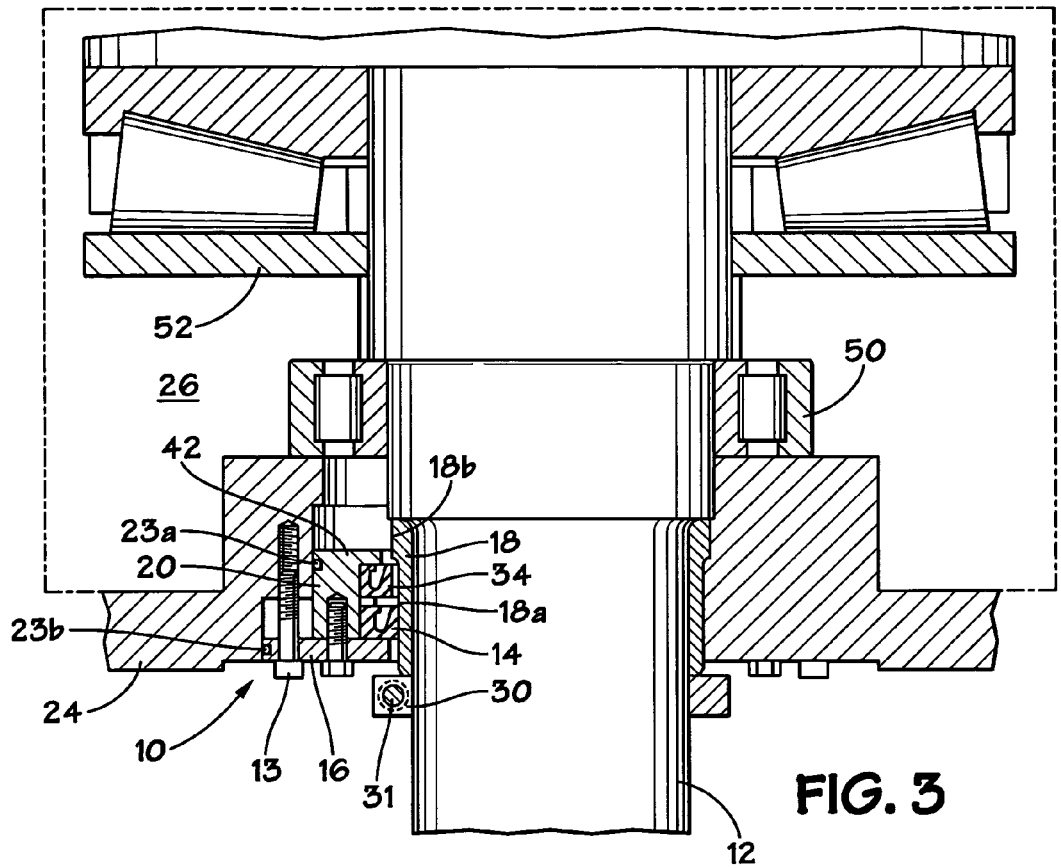
FIG. 3 is a cross-section view of part of the system of FIG. 2.

FIG. 3 illustrates components for a system 10 e.g., as in FIG. 2 (like numerals indicate like parts). One embodiment of the seal system 10 for a main shaft 12 of the top drive system S has a primary seal 14 on a support 16 of a seal carrier 20 that seals against a lower exterior surface 18a of a seal ring 18. The seal carrier 20 is bolted with bolts 13 to a support member 24 which is connected adjacent structure of the top drive. Fluid, (e.g. oil, lubricant in a gear box or housing 26) is prevented from going past this seal 14. Optionally, a split ring 30 with a connecting bolt 31 (or bolts) hold the seal ring 18 on the shaft 12; or the seal ring is secured directly to the shaft. Optionally, the seal ring itself can be fixed or adhered to the main shaft with an interference fit, suitable fasteners, connectors, and/or adhesives, with or without the split ring 30. Seals 23a and 23b seal a member-24/carrier-20 interface.

The support 16 is bolted to (or formed integrally of) a body 42. The bolt 13 secures the support 16 to the support member 24. The support 16 and body 42 are movable up and down by rotating the bolt 13 (multiple bolts may be used).

Part of a typical lower radial bearing apparatus 50 is above the support member 24. A main thrust bearing apparatus 52 is located within the box or housing 26 (shown schematically in dotted lines). The lubricating oil for these bearings is maintained on these bearings without leaking past the seal system 10.

A secondary seal 34 is secured to the body 42 (e.g. by an interference fit, fastener(s), and/or adhesives). The secondary seal 34 does not initially contact the surface 18a since it is smaller in diameter than the primary seal 14. In order to utilize the secondary seal 34 to seal against the seal ring 18, the bolt 13 (or bolts) is turned to raise the support 16 and the body 42 so that the secondary seal 36 is moved adjacent a secondary surface 18b of the seal ring 18. The secondary surface 18b has a larger diameter than the surface 18a so that when the secondary seal 35 is raised, it sealingly contacts the secondary surface 18b. Optionally, additional seal(s) like the seal 34 are positioned above the seal 34 and the seal ring 18 has additional sealing surfaces for the additional seal(s) to sealing contact when the seal(s) are raised into seating position. Each additional seal surface (higher than the preceding seal surface) has a larger diameter than the preceding (lower) seal surface and each additional seal (higher than the preceding seal) has a smaller diameter than the preceding (lower) seal. It is to be understood that FIG. 3 illustrates one half of the seal system 10 (on the left side in FIG. 3) and that ring, seals, etc. on the right side (not shown) mirror the left side. The seal 14 inhibits the flow of debris and contaminants to the seal 34. In one aspect the seal 34 is within the space of the housing 26 and is bathed in lubricant, further protecting the seal 34 until it is used.

It is within the scope of the present invention to provide a seal ring 18 with two (as shown) surfaces (one a stepped surface) or with three, four or more such steps and with three, four, or more corresponding additional secondary seals.

Figure 4A:
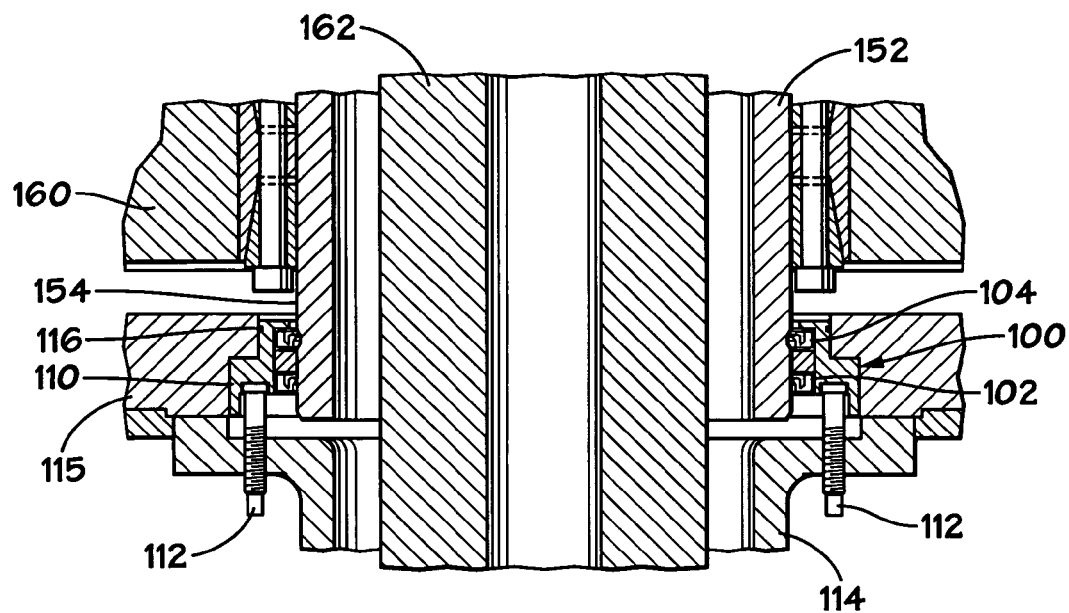
FIG. 4A is a cross-section view of a system according to the present invention.
Figure 4B:
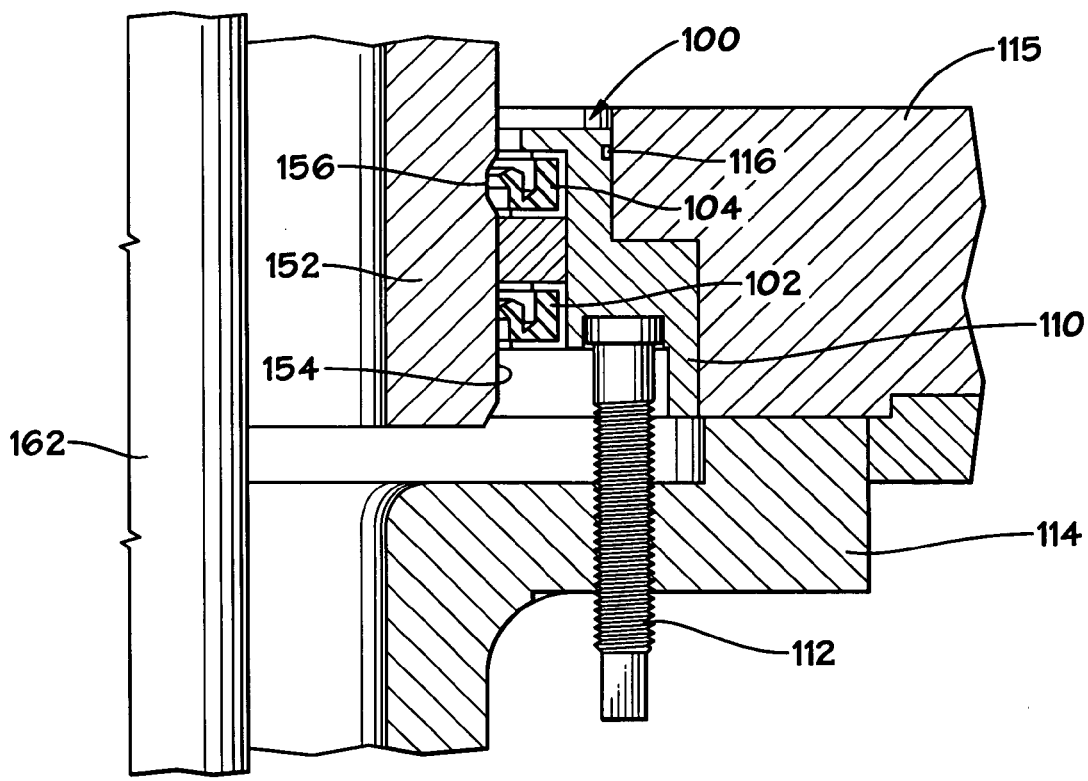
FIG. 4B is an enlargement of part of the system of FIG. 4A.

FIGS. 4A-4C show a seal system 100 according to the present invention for sealing against a quill 152 (shown partially) of a top drive system. The quill 152 is connected to a top drive main shaft 162 (connection not shown) and the quill 152 rotates with the main shaft 162. The quill 152 has an exterior surface 154 and a primary seal 102 of the seal system 100 sealing contacts this exterior surface 154.

The quill 152 has a circumferential groove 156 and a secondary seal 104, as shown in FIGS. 4A and 4B, is adjacent the groove 156 and is not yet in contact with the quill 152. The seals 102, 104 are circumferential seals that extend around he circumference of the quill 152. A seal 116 seals a carrier-110/member-115 interface.

The seals 102 and 104 are secured to a seal carrier 110. Rotatable bolts 112 (or a single bolt) rotatably connected to the seal carrier 110 project through a member 114 (e.g., but not limited to a stem associated with a lower link adapter). Rotating the bolts 112 moves the seal carrier 110 down with respect to a member 115, as shown in FIG. 4C, to move the secondary seal 104 down past the groove 156 until the seal 104 sealingly contacts the exterior surface of the quill 152 optionally and/or alternatively, the bolt(s) 112 are rotatable to raise the seal carrier 110 to move the seal 104 up into sealing contact with the quill 152 (with sufficient space provided above the seal carrier to accomplish this).

Gearing 160 of the top drive, driven by a top drive motor (not shown) is connected with and drives the quill 152 (which drives the main shaft 162). Lubricant for the gearing 160 is prevented from flowing down by the seal system 100.

Optionally and/or alternatively, the groove 156 is on the main shaft and the seal system is located so that seal system's seals seal against the main shaft (with or without a quill).

Optionally and/or alternatively, a seal carrier according to the present invention may have a threaded outside diameter that threadedly mates with a corresponding threaded part adjacent a rotating shaft so that the seal carrier may be moved up or down with respect to the shaft by rotating the seal carrier and moving it up or down as the seal carrier's threads engage the adjacent part's threads.

Figure 3A:
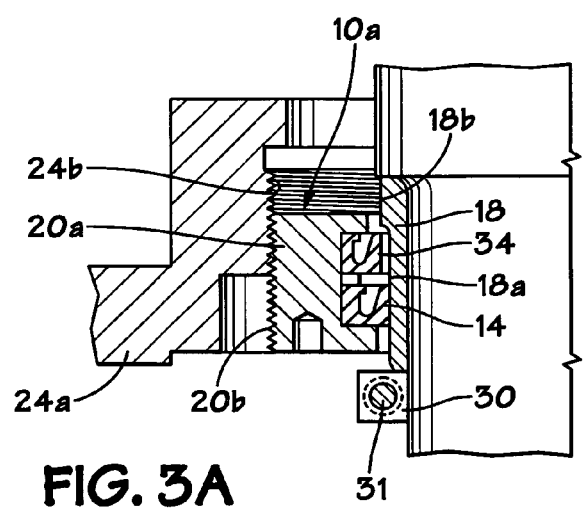
FIG. 3A is a cross-section view of part of a system according to the present invention.

As shown in FIG. 3A, a system 10a (like the system 10, FIG. 3; like numerals indicate like parts) has a seal carrier 20a with a threaded side 20b which threadedly mates with threads 24b of a support member 24a. Rotating the seal carrier 20a moves the seal 34 up to sealingly contact the surface 18b.

As shown in FIG. 4D, a system 100a (like the system 100, FIG. 4A; like numerals indicate like parts) has a seal carrier 110a with a threaded side 110b that threadedly mates with threads 115b of a member 115a. Rotating the seal carrier 110a moves the seals 102, 104 with respect to the quill 152 and its groove 156. Rotating the seal carrier 110a in either direction sufficiently will move the seal 104 into sealing contact with the quill 152.

The present invention, therefore, provides in some, but not in necessarily all, embodiments a top drive system for wellbore operations, the top drive system including: motor apparatus; a main shaft having a top end and a bottom end; a gear system driven by the motor apparatus and interconnected with the main shaft for driving the main shaft; a sealing assembly adjacent the main shaft for sealing against the main shaft, the sealing assembly having a seal carrier adjacent the main shaft, a primary seal member on the seal carrier, the primary seal member sealingly contacting the main shaft, at least one secondary seal on the seal carrier, and the seal carrier selectively movable to move the at least one secondary seal into sealing contact with the main shaft. Such a system may have one or some, in any possible combination, of the following: wherein the main shaft has a seal ring connected to the main shaft, the seal ring having a first portion with a first diameter and a second portion with a second diameter the first diameter smaller than the second diameter, the primary seal member is sealing contact with the first portion of the seal ring, the secondary seal member adjacent the second portion of the seal ring, and the seal carrier movable to move the secondary seal into sealing contact with the second portion of the seal ring; a retainer releasably securable to the main shaft to hold the seal ring in place; wherein the seal carrier is releasably secured to part of the top drive adjacent the main shaft with at least one rotatable bolt threadedly mated with the part of the top drive so that rotating the at least one bolt moves the at least one secondary seal into sealing contact with the main shaft; and/or wherein the seal carrier has a carrier threaded surface and part of the top drive system adjacent the main shaft has a part threaded surface, the seal carrier rotatable with the carrier threaded surface threadedly engaging the part threaded surface so that the seal carrier is movable to move the at least one secondary seal into sealing contact with the main shaft.

The present invention, therefore, provides in some, but not in necessarily all, embodiments a top drive system for wellbore operations, the top drive system including: motor apparatus; a main shaft having a top end and a bottom end; a quill connected to the main shaft; a gear system connected to the quill for driving the quill to drive the main shaft; the quill having an exterior surface and a circumferential groove; a gear system driven by the motor apparatus; a sealing assembly adjacent the main shaft for sealing against the main shaft, the sealing assembly having a seal carrier adjacent the main shaft, a primary seal member on the seal carrier, the primary seal member sealingly contacting the exterior surface of the quill, at least one secondary seal on the seal carrier, the secondary seal initially positioned adjacent and spaced-apart from the groove and not in sealing contact with the quill, the seal carrier selectively movable to move the at least one secondary seal into sealing contact with the exterior surface of the quill. Such a system may have one or some, in any possible combination, of the following: wherein the seal carrier is releasably secured to part of the top drive with at least one rotatable bolt threadedly mated with the part of the top drive so that rotating the at least one rotatable bolt moves the at least one secondary seal into sealing contact with the exterior surface of the quill; and/or wherein the seal carrier has a carrier threaded surface and part of the top drive system adjacent the main shaft has a part threaded surface, the seal carrier rotatable with the carrier threaded surface threadedly engaging the part threaded surface so that the seal carrier is movable to move the at least one secondary seal into sealing contact with the main shaft.

The present invention, therefore, provides in some, but not in necessarily all, embodiments a seal system for sealing against a shaft, the seal system including: a first surface area on a shaft, the shaft being generally cylindrical; at least one second surface area on the shaft; the first surface area and the at least one second surface area on the shaft extending circumferentially around the shaft; the first surface area having a diameter different from a diameter of the at least one second surface area; a seal carrier; a first seal on the seal carrier, the first seal in sealing contact with the first surface area of the shaft; at least one second seal on the seal carrier, the at least one second seal initially not in contact with the shaft; and the seal carrier movable to move the at least one second seal into sealing contact with the at least one second surface area. Such a system may have one or some, in any possible combination, of the following: the first surface area has a diameter smaller than the at least one second surface area; the first surface area has a diameter equal to the second surface area, the shaft has a circumferential groove therearound and the at least one second seal is initially adjacent and not in contact with the groove, the seal carrier movable to move the at least one second seal into sealing contact with the second surface area; wherein the seal carrier is releasably secured to a part of a mechanical system including the shaft with at least one rotatable bolt threadedly mated with the part so that rotating the at least one bolt moves the at least one secondary seal into sealing contact with the shaft; and/or wherein the seal carrier has a carrier threaded surface and a part of a mechanical system adjacent the shaft has a part threaded surface, the seal carrier rotatable with the carrier threaded surface threadedly engaging the part threaded surface so that the seal carrier is movable to move the at least one secondary seal into sealing contact with the shaft.

The present invention, therefore, provides in some, but not in necessarily all, embodiments a method for sealing against a shaft of a mechanical system, the mechanical system including motor apparatus, a shaft having a top end and a bottom end, a gear system driven by the motor apparatus and interconnected with the shaft for driving the shaft, a sealing assembly adjacent the shaft for sealing against the shaft, the sealing assembly having a seal carrier adjacent the shaft, a primary seal member on the seal carrier, the primary seal member for sealingly contacting the shaft, a second seal on the seal carrier, the second seal not initially in contact with the shaft, and the seal carrier selectively movable to move the second seal into sealing contact with the shaft, the method including: locating the seal carrier so that the primary seal sealingly contacts the shaft, and moving the seal carrier so that the second seal sealingly contacts the shaft. Such a method may have one or some, in any possible combination, of the following: wherein the shaft is a main shaft driven by the motor; wherein the shaft is a quill of a top drive system positioned around and connected to a main shaft of the top drive system, the gear system connected with the quill to drive the quill to drive the main shaft; wherein the mechanical system is a top drive system for wellbore operations; and wherein the shaft is a main shaft driven by the motor.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A top drive system for wellbore operations, the top drive system comprising
    motor apparatus,
    a main shaft having a top end and a bottom end,
    a seal ring around the main shaft, the seal ring having a primary seal surface and a secondary seal surface,
    a gear system driven by the motor apparatus and interconnected with the main shaft for driving the main shaft,
    bearing apparatus around the main shaft, the bearing apparatus containing bearing lubricant,
    a support member around the main shaft below the bearing apparatus,
    a sealing assembly below the support member and adjacent the main shaft for sealing against the main shaft to prevent the bearing lubricant from flowing down out of the bearing apparatus, the sealing assembly comprising
        a seal carrier adjacent the main shaft,
        a primary seal member on the seal carrier, the primary seal member sealingly contacting the primary seal surface of the seal ring,
        at least one secondary seal on the seal carrier,
        the seal carrier selectively movable to move the at least one secondary seal into sealing contact with the secondary seal surface of the seal ring, and
    the seal carrier releasably secured to the support member with at least one rotatable bolt threadedly mated with the support member so that rotating the at least one bolt moves the at least one secondary seal into sealing contact with the secondary surface to seal the ring.

2. The top drive system of claim 1 wherein
    the primary seal surface has a first diameter and the secondary seal surface has a second diameter, the first diameter smaller than the second diameter.

3. The top drive system of claim 1 further comprising
    a retainer releasably securable to the main shaft to hold the seal ring in place.

4. The top drive system of claim 1 further comprising
    a retainer releasably securable to the main shaft to hold the seal ring in place.

5. A top drive system for wellbore operations, the top drive system comprising
    motor apparatus,
    a main shaft having a top end and a bottom end,
    a seal ring around the main shaft, the seal ring having a primary seal surface and a secondary seal surface,
    a gear system driven by the motor apparatus and interconnected with the main shaft for driving the main shaft,
    bearing apparatus around the main shaft, the bearing apparatus containing bearing lubricant,
    a support member around the main shaft below the bearing apparatus,
    a sealing assembly below the support member and adjacent the main shaft for sealing against the main shaft to prevent the bearing lubricant from flowing down out of the bearing apparatus, the sealing assembly comprising
        a seal carrier adjacent the main shaft,
        a primary seal member on the seal carrier, the primary seal member sealingly contacting the primary seal surface of the seal ring,
        at least one secondary seal on the seal carrier,
        the seal carrier selectively movable to move the at least one secondary seal into sealing contact with the secondary seal surface of the seal ring, and
    the seal carrier having a carrier threaded surface, support member having a corresponding member threaded surface, the seal carrier rotatable with the carrier threaded surface threadedly engaging the member threaded surface so that the seal carrier is movable to move the at least one secondary seal into sealing contact with the secondary seal surface.

6. A top drive system for wellbore operations, the top drive system comprising
    motor apparatus,
    a main shaft having a top end and a bottom end,
    a quill connected to the main shaft,
    a gear system connected to the quill for driving the quill to drive the main shaft,
    bearing apparatus around the main shaft, the bearing apparatus containing bearing lubricant,
    a support member around the main shaft below the bearing apparatus,
    the quill having an exterior surface and a circumferential groove,
    a sealing assembly adjacent the quill, the sealing assembly for preventing bearing lubricant from flowing down out of the bearing apparatus, the sealing assembly comprising
        a seal carrier,
        a primary seal member on the seal carrier, the primary seal member sealingly contacting the exterior surface of the quill,
        at least one secondary seal on the seal carrier, the secondary seal initially positioned adjacent and spaced-apart from the groove and not in sealing contact with the quill,
        the seal carrier selectively movable to move the at least one secondary seal into sealing contact with the exterior surface of the quill, and
    the seal carrier releasably secured to the support member with at least one rotatable bolt threadedly mated with the support member so that rotating the at least one rotatable bolt moves the at least one secondary seal away from the groove and into sealing contact with the exterior surface of the quill.

7. A top drive system for wellbore operations, the top drive system comprising
    motor apparatus,
    a main shaft having a top end and a bottom end,
    a quill connected to the main shaft,
    a gear system connected to the quill for driving the quill to drive the main shaft,
    bearing apparatus around the main shaft, the bearing apparatus containing bearing lubricant,
    a support member around the main shaft below the bearing apparatus,
    the quill having an exterior surface and a circumferential groove,
    a sealing assembly adjacent the quill, the sealing assembly for preventing bearing lubricant from flowing down out of the bearing apparatus, the sealing assembly comprising
        a seal carrier,
        a primary seal member on the seal carrier, the primary seal member sealingly contacting the exterior surface of the quill,
        at least one secondary seal on the seal carrier, the secondary seal initially positioned adjacent and spaced-apart from the groove and not in sealing contact with the quill,
        the seal carrier selectively movable to move the at least one secondary seal into sealing contact with the exterior surface of the quill, and the seal carrier having a carrier threaded surface and the support member having a member threaded surface, the seal carrier rotatable with the carrier threaded surface threadedly engaging the member threaded surface so that the seal carrier is movable to move the at least one secondary seal away from the groove and into sealing contact with the quill.

8. A method for sealing against a main shaft of a top drive system, the top drive system comprising motor apparatus, a main shaft having a top end and a bottom end, a seal ring around the main shaft, the seal ring having a primary seal surface and a secondary seal surface, a gear system driven by the motor apparatus and interconnected with the main shaft for driving the main shaft, bearing apparatus around the main shaft, the bearing apparatus containing bearing lubricant, a support member around the main shaft below the bearing apparatus, a sealing assembly below the support member and adjacent the main shaft for sealing against the main shaft to prevent the bearing lubricant from flowing down out of the bearing apparatus, the sealing assembly comprising a seal carrier adjacent the main shaft, a primary seal member on the seal carrier, the primary seal member sealingly contacting the primary seal surface of the seal ring, at least one secondary seal on the seal carrier, the seal carrier selectively movable to move the at least one secondary seal into sealing contact with the secondary seal surface of the seal ring, and the seal carrier releasably secured to the support member with at least one rotatable bolt threadedly mated with the support member so that rotating the at least one bolt moves the at least one secondary seal into sealing contact with the main shaft, the method comprising locating the seal carrier so that the primary seal sealingly contacts the primary seal surface of the seal ring, and moving the seal carrier by rotating the at least one bolt so that the at least one secondary seal sealingly contacts the secondary seal surface.

* * * * *